United States Patent
Gilson et al.

(10) Patent No.: US 10,490,059 B2
(45) Date of Patent: Nov. 26, 2019

(54) PRIORITY-BASED WIRELESS COLLISION AVOIDANCE AND INTERFERING DEVICE RESPONSE

(71) Applicant: Comcast Cable Communications, LLC, Philadelphia, PA (US)

(72) Inventors: Ross Gilson, Philadelphia, PA (US); David Urban, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/843,151

(22) Filed: Dec. 15, 2017

(65) Prior Publication Data

US 2019/0188997 A1 Jun. 20, 2019

(51) Int. Cl.
```
G08B 29/00    (2006.01)
G08B 29/18    (2006.01)
H04Q 9/00     (2006.01)
H04B 17/345   (2015.01)
H04W 24/10    (2009.01)
H04W 28/04    (2009.01)
H04W 74/08    (2009.01)
H04W 84/18    (2009.01)
```
(52) U.S. Cl.
CPC ......... *G08B 29/18* (2013.01); *H04B 17/345* (2015.01); *H04Q 9/00* (2013.01); *H04W 24/10* (2013.01); *H04W 28/04* (2013.01); *H04W 74/0816* (2013.01); *H04Q 2209/40* (2013.01); *H04Q 2209/823* (2013.01); *H04Q 2209/883* (2013.01); *H04W 84/18* (2013.01)

(58) Field of Classification Search
None
See application file for complete search history.

(56) References Cited

U.S. PATENT DOCUMENTS 4,206,449 A * 6/1980 Galvin ............... G08B 26/002
340/505
9,072,109 B2 6/2015 Xiao et al.
(Continued)

FOREIGN PATENT DOCUMENTS

EP 1728318 A4 12/2009

OTHER PUBLICATIONS

Yuan, W., Linnartz, J. P. M. G., & Niemegeers, I. G. M. M. (2010). Adaptive CCA for IEEE 802.15.A wireless sensor networks to mitigate interference. In Proceedings of the 2010 IEEE Wireless Communications and Networking Conference (WCNC), Apr. 18-21, 2010, Sydney, New South Wales (pp. 1-5). Piscataway: Institute of Electrical and Electronics Engineers (IEEE). DOI: 10.1109/WCNC.2010.5506124.

(Continued)

*Primary Examiner* — Julie B Lieu
(74) *Attorney, Agent, or Firm* — Banner & Witcoff, Ltd.

(57) ABSTRACT

Methods, systems, and apparatuses are described for detecting, avoiding, and responding to wireless collisions. Wireless messages may be transmitted at various times and at various transmission power levels based on priorities of the messages, such that limited power and transmission channel resources may be devoted to higher-priority messages. Wireless gateways may manage transmission time windows for connected wireless devices, dynamically adjusting the windows based on detected wireless collisions.

29 Claims, 10 Drawing Sheets

(56) References Cited

U.S. PATENT DOCUMENTS

| | | | | |
|---|---|---|---|---|
| 2003/0007473 | A1* | 1/2003 | Strong | G01S 5/02 |
| | | | | 370/338 |
| 2006/0132301 | A1* | 6/2006 | Stilp | G05B 9/03 |
| | | | | 340/539.22 |
| 2010/0148940 | A1* | 6/2010 | Gelvin | G06F 15/173 |
| | | | | 340/286.02 |
| 2011/0310797 | A1 | 12/2011 | Kobayashi et al. | |
| 2011/0312282 | A1 | 12/2011 | Prather | |
| 2013/0003591 | A1* | 1/2013 | Novak | H04W 72/085 |
| | | | | 370/252 |
| 2015/0228419 | A1* | 8/2015 | Fadell | G08B 17/00 |
| | | | | 307/112 |
| 2016/0183187 | A1 | 6/2016 | Park | |
| 2018/0103392 | A1* | 4/2018 | Emmanuel | H04W 28/04 |
| 2018/0103404 | A1* | 4/2018 | Emmanuel | H04W 28/04 |
| 2019/0007856 | A1* | 1/2019 | Desai | H04W 4/025 |

OTHER PUBLICATIONS

Fouad, Mohamed R., Fahmy, Sonia, Pandurangan, Gopal, "Latency-Sensitive Power Control for Wireless Ad-hoc Networks," Academic Paper, Oct. 2005, pp. 1-8, Purdue University, Montreal, Quebec, Canada.

S. Banergee and A. Misra. "Adapting transmission power for optimal energy reliable multi-hop wireless communication," Technical report, UMIACSTR-2002-103 and CS-TR 4424, Department of Computer Science, University of Maryland, College Park, MD 20742, USA, Nov. 2002.

Attiya, Gamal, "New Strategy for Congestion Control based on Dynamic Adjustment of Congestion Window," Journal, Mar. 2012, vol. 9, Issue 2, No. 2, IJCSI International Journal of Computer Science Issues (Online).

Apr. 5, 2019—Extended European Search Report—EP 18212575.7.

* cited by examiner

PRIORITY-BASED WIRELESS COLLISION AVOIDANCE AND INTERFERING DEVICE RESPONSE

BACKGROUND

Wireless networks often experience collisions due to more than one device attempting to transmit on a same channel during overlapping time periods, which may prevent a receiver from being able to receive and decode the overlapping transmissions. Collisions may also be caused by the presence of interference in the form of wireless (e.g., radio frequency (RF)) noise that may prevent a receiver from being able to receive and decode a transmission.

Collisions may cause wireless devices to resend transmissions, which may reduce the efficiency of a wireless network. Additionally, wireless networks, including wireless sensor networks implemented by security systems, may be vulnerable in the presence of significant interference. Such interference may delay or prevent wireless network nodes from communicating with other wireless devices, which may disrupt the operation of the wireless network and system.

SUMMARY

The following presents a simplified summary in order to provide a basic understanding of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A wireless collision may occur when a receiving device cannot accurately receive, decode and/or process a message due to an overlapping data transmission and/or noise on a transmission channel. When a collision occurs, a transmitting device may retransmit a message in order for the receiving device to receive the message. For wireless devices, which may operate on battery power, avoiding collisions may reduce power usage from repeated transmissions. Moreover, wireless systems and networks may be disabled or impaired by devices that intentionally or unintentionally create wireless noise, thereby creating wireless collisions that hamper communication. For example, in a wireless security system, avoiding collisions of transmissions from security devices may beneficially preserve battery life of the security devices. Additionally, recognizing and responding to the presence of significant interference may prevent the security system from being disabled by a source of wireless noise and/or quickly cause an alert when the security system is disabled.

By transmitting messages at certain times and at certain transmission power levels based on priorities of the messages, limited resources (e.g., in the form of battery power and/or time spent transmitting and re-transmitting) may be devoted to higher-priority messages. A transmitting device may transmit a higher-priority message in the presence of a certain amount of noise on a channel, accepting the risk of a collision and re-transmission, but delay a transmission of a lower-priority message in the presence of the same amount of noise. Furthermore, a transmitting device may transmit a higher-priority message at a higher power in response to a certain amount of noise on a channel as compared to a lower-priority message.

Retransmission time windows may be provided during which devices may retransmit collided messages. Higher-priority messages may be retransmitted during the retransmission windows. The amount of time devoted to the retransmission window may be dynamically adjusted based on a number of detected collisions in order to optimize the efficiency of the wireless network.

Prioritizing important messages (e.g., in a wireless security system) may allow a wireless system to continue to function in the presence of wireless noise. Wireless devices may detect and respond to a high amount of wireless noise that disables communication between the wireless devices.

The details of these and other examples are set forth in the accompanying drawings and the description below. Other features and advantages will be apparent from the description and drawings, and from the claims.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of various examples, reference is made to the accompanying drawings, which form a part hereof. It is to be understood that other examples may be used, and structural and functional modifications may be made, without departing from the scope of the present disclosure.

Figure 1:
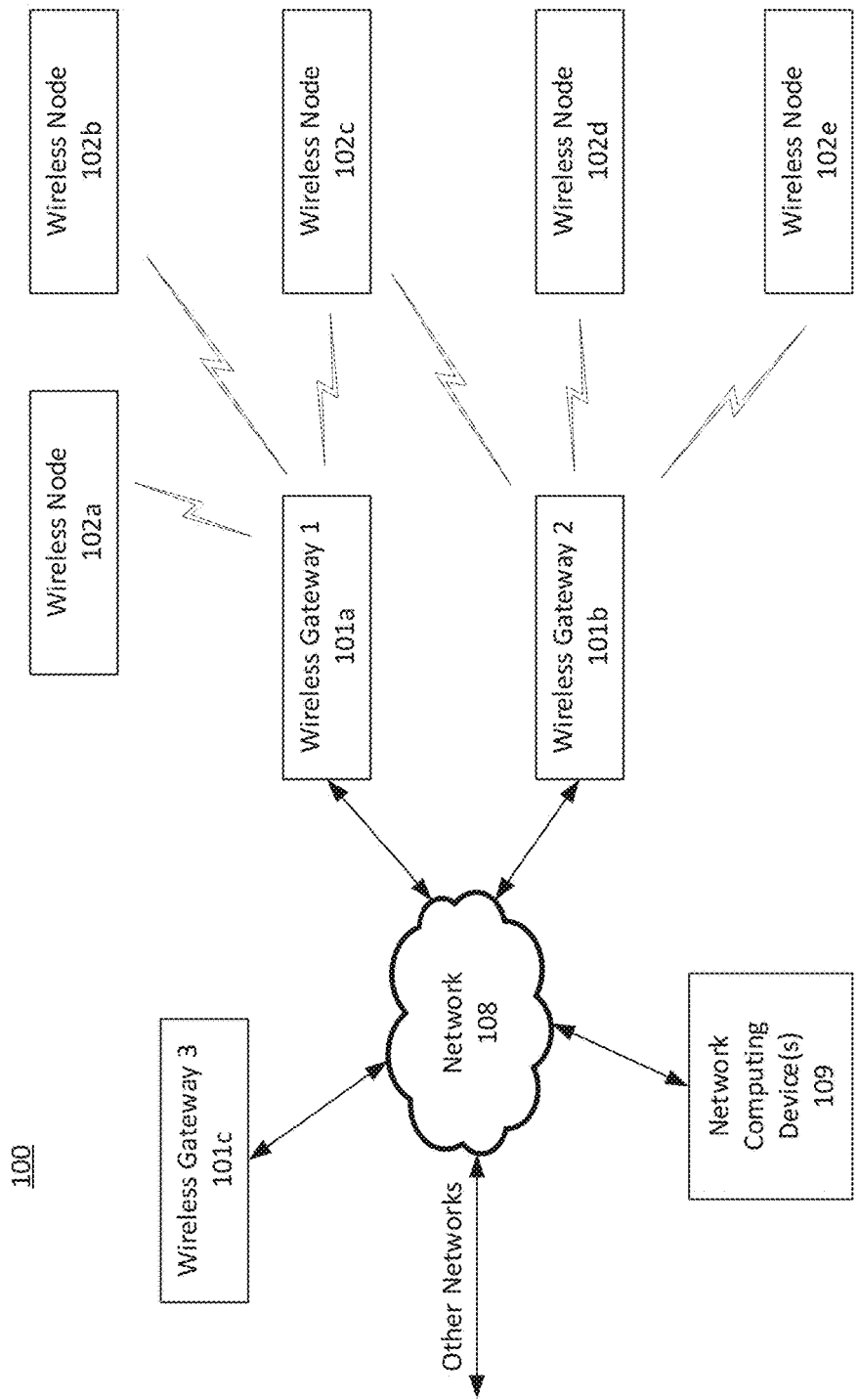
FIG. 1 is a network diagram showing an example network.

FIG. 1 shows an example network 100 in which many of the various features described herein may be implemented. The network 100 may comprise a wireless network including one or more wireless nodes 102a-102e. In the example of FIG. 1, the wireless nodes 102a-102e may communicate with each other and/or with the network computing device(s) 109 via one or more wireless gateways 101a-101c. The network 100 may use various topologies, such as a star topology, a mesh topology, a hybrid topology, and the like.

The features described herein may be suited for use in a low power wireless network. Accordingly, the wireless gateways 101a-101c and the wireless nodes 102a-102e may communicate using a low power wireless networking protocol, such as LORAWAN, NB-IOT, RPMA, SIGFOX, and the like. The network 100 may be a network of any size and/or type, such as a local network or a wide area network. The network 100 may further include a network 108, by which the wireless gateways 101a-101c may connect to each other and to one or more network computing devices 109.

The network 100 may be used for various purposes. The wireless nodes 102a-102e may be devices that include sensors and/or run applications for collecting and exchanging data with other wireless nodes 102a-102e and/or network computing devices 109. Such wireless nodes may be used to implement security systems, smart power grids, transportation systems, home automation systems, and the like. The network 100 may additionally include various components that are not shown, such as sub-networks, servers, routers, and the like.

The wireless gateways 101a-101c may perform various functions for establishing, managing, and maintaining connectivity with the wireless nodes 102a-102e, including handling network join and/or authentication communications, managing network transmission settings such as transmission channels, transmission power requirements, timing windows, and the like, performing device handoff (e.g., to another wireless gateway when a wireless node is moving), and other such functions. One or more wireless gateways 101 may be associated with a particular premises (e.g., as part of a home security system), and the wireless nodes 102 associated with the same premises may be allowed to connect to the associated wireless gateway(s) 101 (e.g., using authentication information, key exchanges, and the like). Additionally or alternatively, the wireless gateway 101 may be part of and/or include a customer premises equipment (CPE) gateway device (e.g., as part of a television distribution system) and/or a set top box.

The network computing devices 109 may be configured to compile and/or analyze data received from the wireless nodes 102 via the gateways 101. For example, a security application running on the network computing device 109 may be configured to receive and/or analyze data from sensors connected to or included in the wireless nodes 102. The network computing device 109 may perform such data reception and/or analysis in order to detect alarm conditions and/or intrusions, send instructions to the wireless nodes (e.g., instructions to turn on/off lights, turn on a security camera, display information on an alarm panel, etc.), send alerts to residents, and the like. A transportation application running on the network computing device 109 may be configured to receive and analyze data from the wireless nodes 102 including or connecting to parking meter sensors, traffic sensors, and other smart grid sensors in order to analyze traffic conditions, instruct parking meters to adjust prices, instruct traffic lights to change timing, and the like. Generally, the network computing device 109 may be configured to offer any desired service, and may use various languages and operating systems (e.g., servlets and JSP pages running on Tomcat/MySQL, OSX, BSD, Ubuntu, Redhat, HTML5, JavaScript, AJAX and COMET) to offer such services. A network computing device 109 may be integrated with a wireless gateway 101.

The network 108 may be any type of information distribution network, such as a satellite, telephone, cellular, wireless, optical fiber network, coaxial cable network, and/or hybrid fiber/coax (HFC) distribution network. Additionally, the network 108 may be a combination of networks (e.g., the Internet), or connect to a combination of networks. The network computing device 109 may communicate with other remote devices and/or systems via the network 108.

Figure 2:
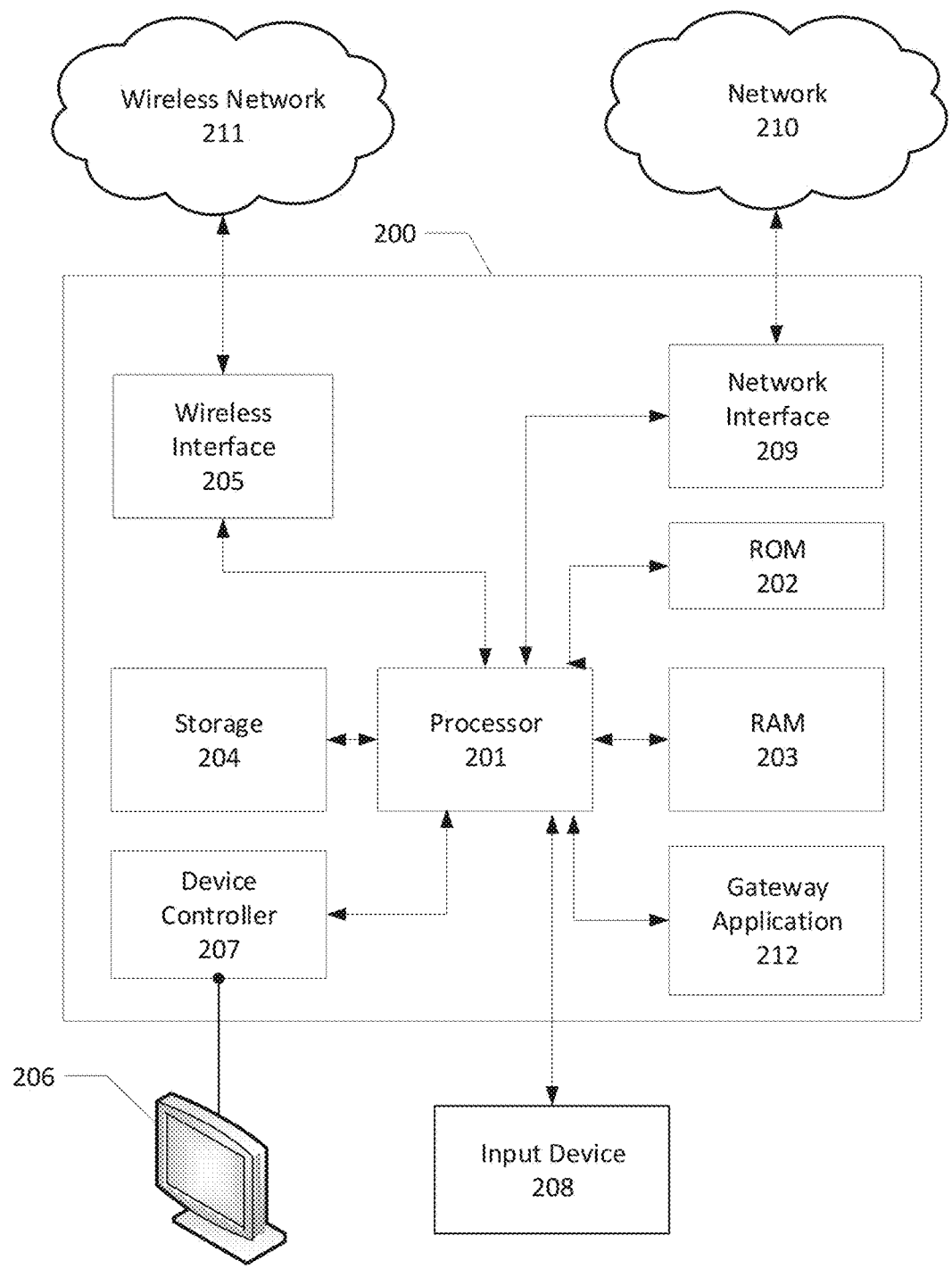
FIG. 2 shows an example wireless gateway.

FIG. 2 shows an example wireless gateway. The wireless gateway 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, or other storage 204. The wireless gateway 200 may include one or more output devices, such as a display 206 (or an external television), and may include one or more output device controllers 207, such as a video processor. There may also be one or more user input devices 208, such as a remote control, keyboard, mouse, touch screen, microphone, etc. The wireless gateway 200 may also include one or more network interfaces, including a network interface 209 (such as a network card) to communicate with a network 210, and a wireless interface 205 to establish the wireless network 211 and/or communicate with one or more wireless nodes. The network interface 209 may be a wired interface, wireless interface, or a combination of the two. The network interface 209 may include a modem (e.g., a cable modem), and the network 210 may include the network 108 shown in FIG. 1, or any other desired network. The wireless gateway may be and/or include a set top box and/or a CPE gateway. The wireless gateways 200 may store and execute a gateway application 212 that implements one or more features of the present description.

FIG. 2 shows an example of hardware configuration. Modifications may be made to add, remove, combine, divide, etc. components as desired. Additionally, the components shown may be implemented using basic computing devices and components, and the same components (e.g., the processor 201, the storage 202, a user interface, etc.) may be used to implement any of the other computing devices and components described herein.

Figure 3:
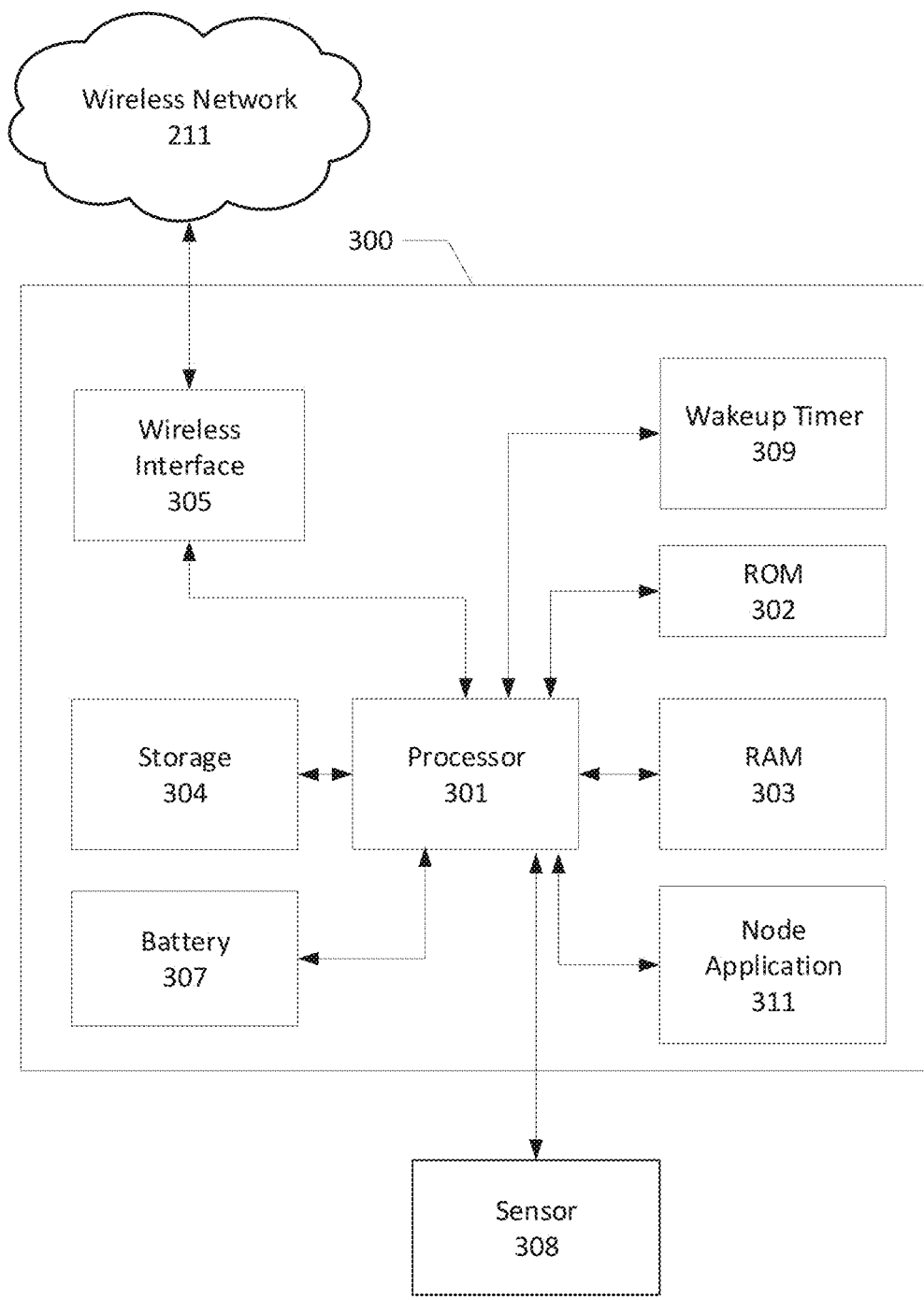
FIG. 3 shows an example wireless node.

FIG. 3 shows an example wireless node. The wireless node 300 may include one or more processors 301, which may execute instructions of a computer program to perform any of the features described herein. The instructions may be stored in any type of computer-readable medium or memory, to configure the operation of the processor 301. For example, instructions may be stored in a read-only memory (ROM) 302, a random access memory (RAM) 303, or other storage 304. The wireless node 300 may also include a wireless interface 205 to join the wireless network 211 and/or communicate with one or more wireless gateways. The wireless node 300 may be powered by a battery 307 or other power source, and a wakeup timer 309 may be used to enter a low power mode in order to conserve power (e.g., between sensor readings and/or data transmissions). The wireless node 300 may include and/or communicate with one or more sensors 308 that may be used to collect sensor data. The wireless nodes 300 may include a node application 311 that implements one or more features of the present description.

FIG. 3 shows an example of hardware configuration. Modifications may be made to add, remove, combine, divide, etc. components as desired. Additionally, the components shown may be implemented using basic computing devices and components, and the same components (e.g., the processor 301, the storage 302, a user interface, etc.) may be used to implement any of the other computing devices and components described herein.

A wireless node 300 may be configured to execute processes for transmitting data messages to one or more receiving devices, such as a wireless gateway 200. The wireless node 300 may attempt to avoid wireless collisions at the receiving device based on a priority associated with a message. A wireless collision may occur when a receiving device cannot accurately receive, decode and/or process a message due to an overlapping data transmission and/or noise on the transmission channel. When a collision occurs, the wireless node 300 may attempt to transmit the message again in order for the receiving device to receive the message. The wireless node 300, which may operate on battery power from the battery 307, may attempt to avoid transmitting packets that will likely collide to conserve power from repeated transmissions. The wireless node 300 may accept a greater risk of collision for a higher-priority message than a lower-priority message in order to avoid using battery power to retransmit lower-priority messages.

Figure 4:
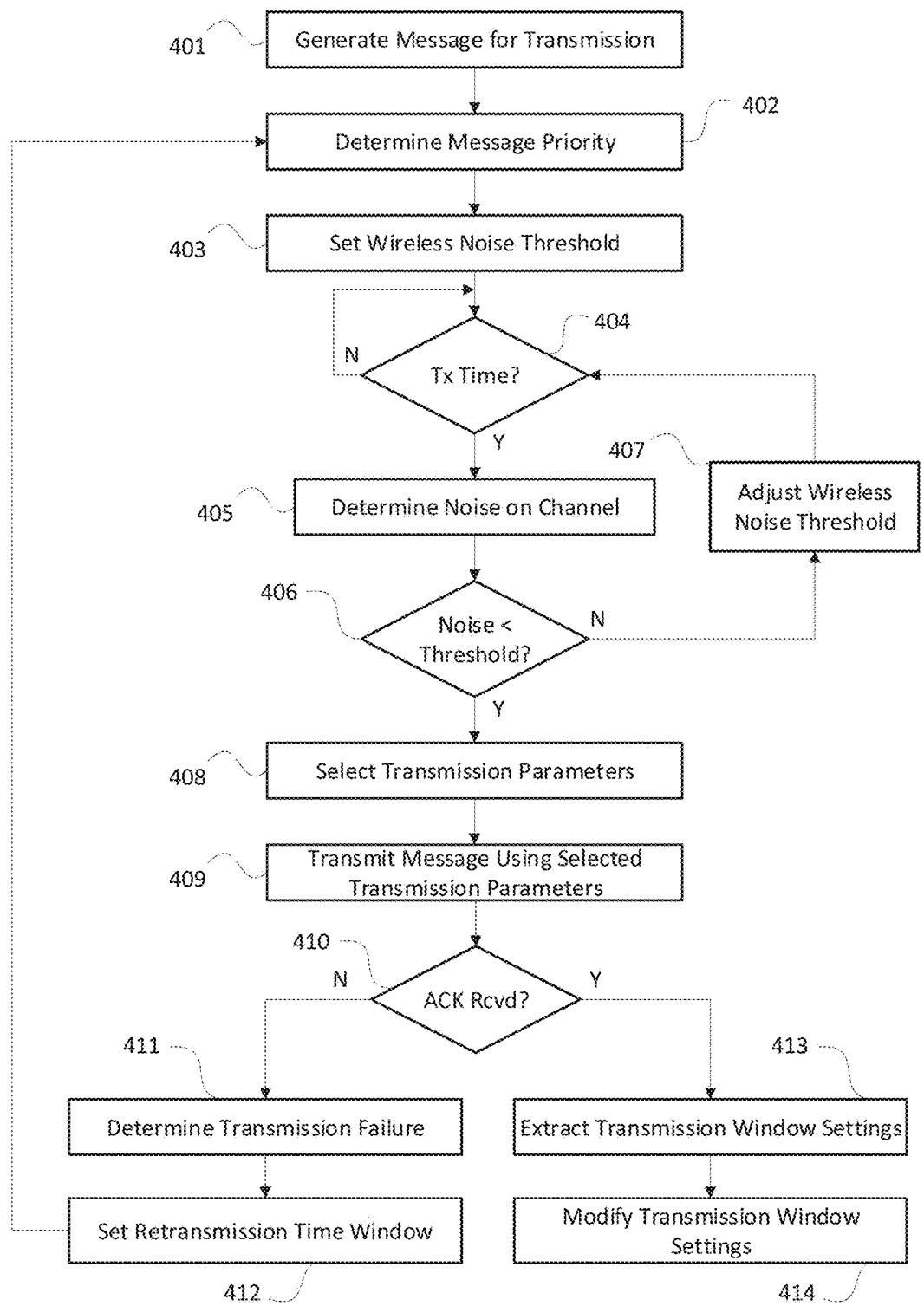
FIG. 4 is an example process flow implemented by a wireless node.

FIG. 4 shows an example process flow that may be executed by a wireless node 300 for transmitting a message (e.g., one or more packets) in accordance with a clear channel assessment, a selected transmission power level, and/or a transmission window. The clear channel assessment may be performed in accordance with a priority associated with each message, and the transmission power level and/or the transmission window may be selected based on a priority associated with each message. The process flow of FIG. 4 may be carried out by a sensor device, a security device, or any wireless node 300 communicating with a wireless gateway 200 or another device in a wireless network, such as a wireless network optimized for low-power data transmissions.

The wireless node 300 may use a clear channel assessment to determine whether a transmission channel is available for transmission by measuring a wireless noise level (e.g., an RF noise level) before transmitting a message. If the measured wireless noise level is above a wireless noise threshold, the wireless node 300 may wait before sending the message in order to avoid a transmission failure (e.g., due to a potential collision with another device currently transmitting data or some other source of wireless noise). A transmission window may specify the time period(s) during which the wireless node 300 is allowed to transmit. A transmission power level may be selected in order to increase the chance of successful reception by the wireless gateway 200 while decreasing power consumption of the wireless node 300.

In step 401, the wireless node 300 may generate a message (e.g., one or more packets) for transmission. For example, a node application 311 running on a wireless node 300 may determine that sensor data is ready for transmission to a wireless gateway 200, and generate a message containing the sensor data. For example, a parking meter sensor running a parking application may determine that a car is parked in an adjacent space, but a parking fee has not been paid, and accordingly, the parking meter sensor may generate a packet comprising data indicating a "car is present" state of the parking sensor and/or an "unpaid" state of the parking application. The wireless node 300 and/or the node application 311 being executed by processor 301 may generate the message in conjunction with the wireless interface 305, which may handle, for example, MAC-layer packet formatting. For example, the wireless interface 305 may format a packet to include preamble, header, and checksum data as required by the wireless network 211 and/or the wireless gateway 200.

In step 402, the wireless node 300 may determine a priority associated with the message. The priority may be assigned by the sensor application based on a type of the message. For example, a security application running on a door sensor may assign a low priority to a periodic transmission indicating that the door sensor is functioning normally, but assign a very high or maximum priority to a transmission indicating the door has been opened while in an armed mode. The message priority may be one of a defined set of states (e.g., "low," "normal," and "high"), a numeric value, and/or any other value indicating a priority. The priority value may be stored as metadata associated with the generated message (e.g., in a header of a packet containing the generated message).

In step 403, the wireless node 300 may select a wireless noise threshold based on the determined priority. The wireless node 300 may use the wireless noise threshold to determine an appropriate time to transmit on a particular channel(s) based on the current wireless noise on that channel(s). If a wireless node 300 detects wireless noise above a wireless noise threshold, the wireless node 300 may attempt to wait until the channel is sufficiently clear (e.g., until the wireless noise drops below the wireless noise threshold) before transmitting. The wireless noise threshold may be increased over time, so that the wireless node 300 may attempt a transmission if wireless noise on the channel is persistent. The process of waiting for the wireless noise to drop below the wireless noise threshold and/or increasing the wireless noise threshold over time may be referred to as a clear channel assessment.

Figure 5A:
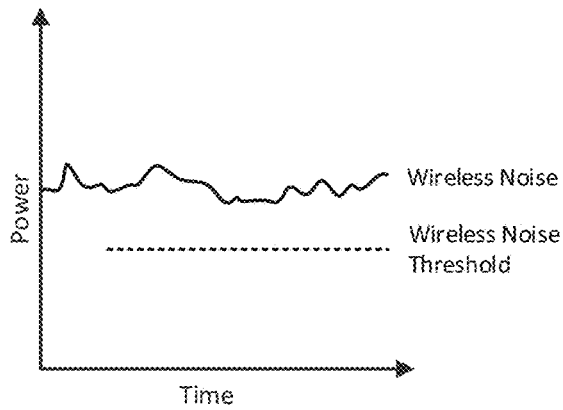
FIGS. 5A-5D are example diagrams indicating the operation of a radio frequency noise threshold.
Figure 5B:
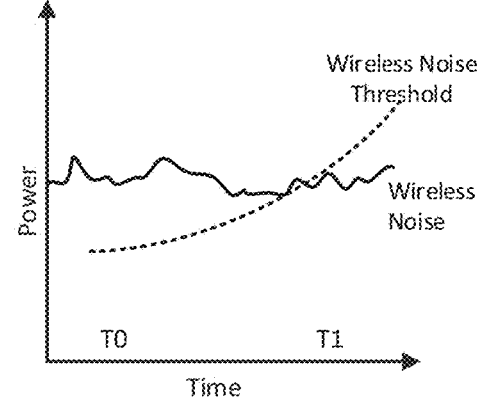

FIGS. 5A-5B show two example clear channel assessments. FIG. 5A shows an example wireless noise threshold that does not change over time. The example wireless noise threshold is set at a particular power level. The wireless node 300 may wait until a wireless measurement of the channel falls below the fixed wireless noise threshold before attempting to transmit. If measured wireless noise on the channel never drops below the wireless noise threshold in a given time period, the wireless node 300 will not be ready to transmit in that time period. Due to the possibility of persistent wireless noise on the channel, a static wireless noise threshold as shown at FIG. 5A may correspond to lower priority messages.

FIG. 5B shows an example wireless noise threshold that increases over time. For example, the time T0 may correspond to a first time at which the wireless node 300 attempts to transmit a message. Because the signal strength of wireless noise is above the wireless noise threshold at time T0, the wireless node 300 will not transmit. However, as time goes on, the wireless noise threshold may dynamically increase. After some time, the wireless noise threshold may increase enough to be higher than the wireless noise on the channel, as shown at time T1. At or after time T1, the wireless node 300 may transmit the message. Using a dynamic wireless noise threshold, the wireless node 300 attempts to avoid a potential collision by waiting until wireless noise drops; but if the wireless noise does not drop, the wireless node 300 may raise the wireless noise threshold so that a high priority message may be sent even in the presence of persistent noise. In this way, the wireless node 300 may balance avoidance of potential collisions with a need to transmit messages in the presence of persistent noise.

FIG. 5B shows that, during the clear channel assessment, the wireless noise threshold may increase non-linearly from an initial level. The wireless noise threshold may increase linearly or non-linearly from an initial level, may remain at one level for some time before increasing, may increase by a certain amount every time the wireless node 300 device attempts to transmit, may increase up to a certain maximum level, and/or other variations. For example, the wireless node 300 may increase the wireless noise threshold using a formula based on the time elapsed since the wireless node 300 first attempted to transmit a message (e.g., a packet or group of packets) at time T0 (which may correspond to a time at which the wireless node executes step 406 of FIG. 4)

and/or the number of attempts to transmit the message (e.g., the number of iterations through step 406 of FIG. 4).

At step 404 of FIG. 4, the wireless node 300 may determine whether one or more transmission windows allow the wireless node 300 to transmit. A network protocol and/or a wireless gateway 200 may establish transmission window (s) and assign all or some wireless nodes 300 to transmit during certain transmission windows (e.g., during certain pre-defined time periods). Therefore, the wireless node 300 may wait until the current time matches and/or falls within a certain transmission window before proceeding.

At step 405, the wireless node 300 determines wireless noise on a channel or band of channels by measuring the strength of a signal received via the wireless interface 305. The wireless noise metric may indicate signal strength in relative or absolute (e.g., dBm, mW) units. Thus, at step 405, the wireless node 300 may sample and measure a signal received (e.g., over a small time period) via an antenna of the wireless node 300, the metric indicating the wireless noise on the channel.

At step 406, the wireless node 300 may determine whether the measured wireless noise level is less than the wireless noise threshold. The first time the process reaches step 406, the wireless noise threshold may be set at an initial value as indicated for step 403. In subsequent passes through step 406 (e.g., because the wireless noise is greater than the wireless noise threshold and the process loops back through step 407), the wireless node 300 may increase the wireless noise threshold. If the wireless noise metric is not less than the wireless noise threshold, the wireless node 300 may avoid transmitting, and accordingly proceed to step 407.

At step 407, the wireless node 300 may increase the wireless noise threshold. The wireless node 300 may increase the wireless noise threshold as a function of elapsed time (e.g., an elapsed time since the process first reached step 406). A specific function used to increase the wireless noise may be selected based on the priority of the message as determined at step 402. For example, the wireless node 300 may increase the wireless noise threshold more for a higher priority message.

Before and/or after step 407, the wireless node 300 may wait or sleep for a certain period in order to allow time for the wireless noise to potentially reduce and/or for the wireless noise threshold to increase based on the elapsed time. The wireless node 300 may use the wakeup timer 309 to set a wake up time according to a priority of the message, such that a higher priority packet causes the wireless node 300 to sleep for less time (e.g., to attempt to transmit the message more often). During a sleep period, the wireless node 300 may disable (e.g., power down or suspend) one or more of its components (e.g., the wireless interface 305, the application 311, the processor 301, etc.).

After step 407, the process may return to steps 404-406 in order to attempt to transmit the message again during the correct time window and when measured wireless noise is less than the adjusted wireless noise threshold. If the test of step 406 is passed, the process proceeds to step 408.

The wireless node 300 may repeatedly measure wireless signal strength on the channel until it determines that the wireless noise is less than the wireless noise threshold. Accordingly, the wireless node 300 may compare one or more measurements of wireless noise to a wireless noise threshold in order to determine whether it will transmit or not.

Figure 5C:
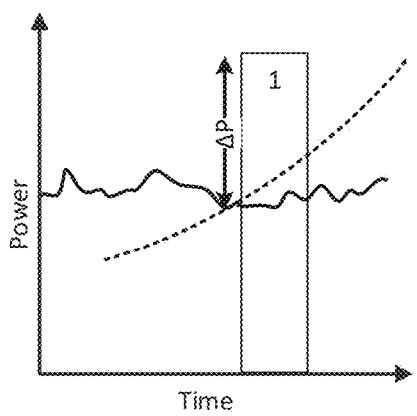

At step 408, the wireless node 300 selects the transmission power level for the message before transmitting the message in step 409. The wireless node 300 may select the transmission power level based on the message priority and/or one of the measured wireless noise or wireless noise threshold. FIG. 5C shows an example transmission of a packet 1 after a wireless noise threshold increases past a wireless noise level. The wireless node 300 may transmit the message at a power level relative to the wireless noise and/or wireless noise threshold at the time of transmission, or shortly before transmission. For example, the wireless node 300 may transmit the packet 1 at a power level that is a certain power level (e.g., ΔP dBm) greater than the power level of the wireless noise threshold at transmission time. Furthermore, the wireless node 300 may select the amount of ΔP based on the priority of the message, such that higher priority messages may be transmitted at higher power levels relative to the wireless noise on the channel and/or the value of the wireless noise threshold at transmission time.

Figure 5D:
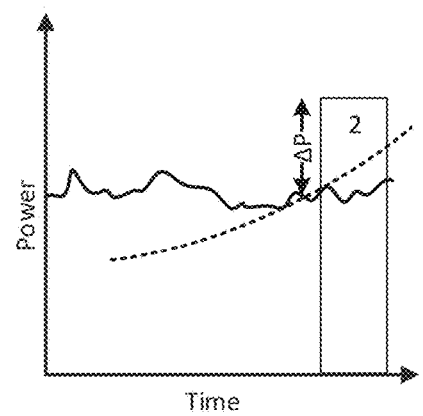

FIG. 5D shows the example transmission of a packet 2 after a wireless noise threshold increases past a wireless noise level. Packet 2 may be a lower priority packet than packet 1 of FIG. 5C. The wireless node 300 may increase the wireless noise threshold more slowly than in FIG. 5C, and thus relatively more time may elapse before packet 2 is ready to transmit. Additionally or alternatively, the value of ΔP may be smaller for packet 2 due to the relatively lower priority. Accordingly, the transmission power of packet 2 may be lower and/or closer to the wireless noise threshold and/or wireless noise. A message priority may be used by the wireless node 300 to determine or select a transmission power, a formula for increasing the wireless noise threshold, or both.

At step 409 of FIG. 4, the wireless node 300 may transmit the message (e.g., encapsulated in one or more data packets). The wireless node 300 may embed, in the transmitted message, meta information about the wireless noise level, the wireless noise threshold, the message priority, and/or other meta information. For example, the wireless node 300 may embed, in a header of one or more packets containing the message, one or more wireless noise measurements (e.g., the most recent N number of wireless noise measurements), the transmission power level, a number of times the packet was retransmitted due to collision(s), and/or the level of the wireless noise threshold at or before transmission of the message. Such meta information may be used by the wireless gateway 200 to adjust one or more transmission window settings.

At step 410, the wireless node 300 may confirm that the message was received by the wireless gateway 200 based on reception of an acknowledge (ACK) message from the wireless gateway 200. The wireless node 300 may wait a period of time to determine whether an ACK message was received from the wireless gateway 200. The wireless node 300 may listen for the ACK message during one or more time windows (e.g., defined downlink windows) and/or may listen for a certain amount of time before concluding that an ACK message will not be received.

If no ACK message is received, at steps 411 and 412 the wireless node 300 may determine that the transmission failed and set a retransmission window (e.g., so that in step 404 the process may test whether a current time is within a retransmission window in addition to or as an alternative to the transmission window). The wireless node 300 may then return to step 402 to determine a priority for the retransmitted message. The retransmitted message may be increased in priority in comparison to the original message. The wireless node 300 may avoid attempting to retransmit if the message has a low priority (e.g., if a priority value of the message is below a threshold priority level) and end the process.

Figure 6:
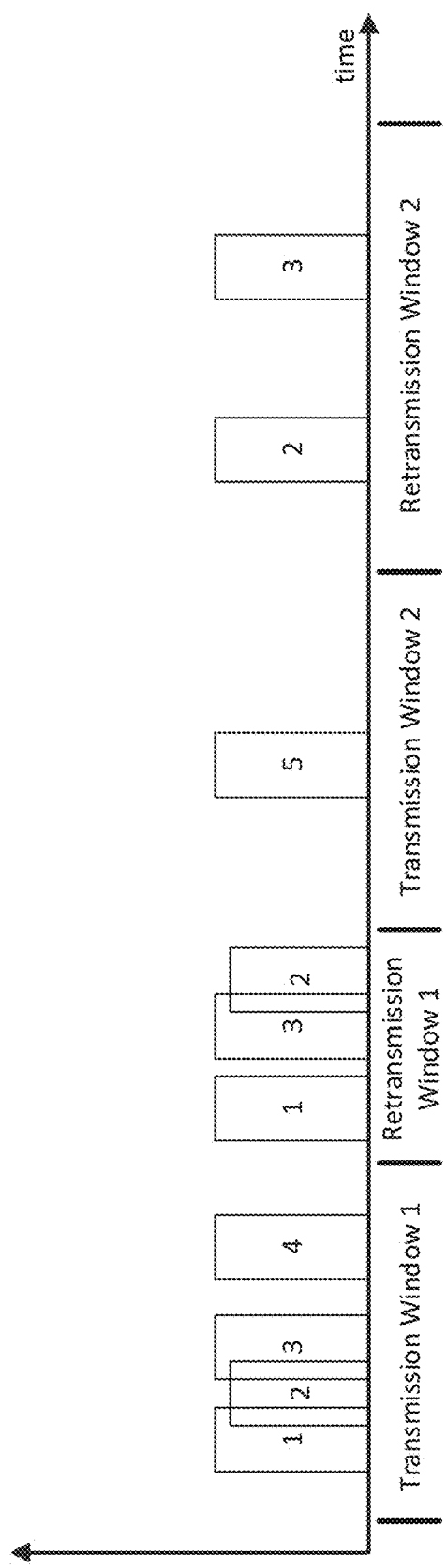
FIG. 6 is an example diagram indicating transmission windows.

FIG. 6 shows an example of managing and assigning transmission windows and retransmission windows by the wireless gateway 200. FIG. 6 shows an example time sequence of messages or packets received from different wireless nodes 300 at the wireless gateway 200.

During a first transmission window, packets 1-4 are received. The reception of packets 1-3 overlap at the wireless gateway 200, thereby causing a collision at the wireless gateway 200. Due to the collision, the wireless gateway 200 may be unable to decode and/or process some or all of packets 1-3. Accordingly, it may avoid sending ACK messages back to the wireless nodes 300 that transmitted packets 1-3. Those wireless nodes 300, in turn, may detect failed transmissions by the absence of a received ACK message, and attempt to retransmit the packets 1-3 during the first retransmission window.

The wireless gateway 200 may, in some examples and/or at some times, establish a retransmission window for wireless nodes 300 to retransmit failed transmissions. The retransmission window may repeat periodically in order to provide an opportunity for wireless nodes 300 to retransmit a message that collided (or otherwise failed to successfully transmit). In some cases, the wireless nodes 300 may only send retransmitted messages in retransmission windows. In other cases, retransmitted messages may be sent in either a regular transmission window or a retransmission window, thereby expanding the available transmission opportunities for retransmitted messages.

The wireless gateway 200 may define the transmission windows, retransmission windows, and/or other transmission window settings (e.g., whether retransmitted messages may be sent during regular transmission windows in addition to retransmission windows, a minimum priority for sending a message in a retransmission window, etc.) and send the transmission window settings configuring each wireless node 300 to use the transmission window settings. For example, the wireless gateway 200 may regularly (e.g., periodically and/or after updating transmission window settings) broadcast the transmission window settings to some or all of the wireless nodes 300. The wireless gateway 200 may send the transmission window settings to a wireless node 300 in response to a request for transmission window settings from the wireless node 300.

Retransmitted messages may collide again during a retransmission window. FIG. 6 shows that a retransmitted packet 1 is successfully received during the first retransmission window, but retransmitted packets 2 and 3 collide again. After detecting one or more repeated collisions and/or a large number of collisions, the wireless gateway 200 may extend the length of the retransmission window, as shown by the longer second retransmission window. The wireless gateway 200 may broadcast the updated transmission window settings configuring the wireless nodes 300 to use the updated transmission and retransmission windows. Additionally or alternatively, the wireless gateway 200 may include updated transmission window settings as metadata in ACK messages or other messages sent to wireless nodes 300. For example, headers of ACK messages (and/or other types of messages) sent from the wireless gateway may contain transmission window settings.

If the wireless node 300 receives an ACK message at step 410 of FIG. 4, the ACK message may contain adjusted transmission window settings. At step 413, the transmission window settings (if present in the ACK message) may be extracted by the wireless node 300 and, at step 414, the wireless node 300 may modify its transmission window settings accordingly.

The transmission window settings may include timing information, such as time offsets (e.g., relative to a beacon signal regularly transmitted from the wireless gateway 200 and/or a clock signal generated by a local clock of the wireless node 300) for determining transmission windows, retransmission windows, and/or any other time windows (e.g., downlink windows during which a wireless node 300 may wake up and listen for messages from wireless gateway 200). Additionally or alternatively, the transmission window settings may include an indication that a retransmission window has been enabled or disabled, an indication that default transmission window settings should be used, and/or other such indications. The transmission window settings may indicate a minimum priority level for retransmitting messages during a retransmission time window, such that the wireless nodes 300 will not attempt to retransmit messages having a priority falling below the threshold, or will only retransmit such messages during a regular transmission window.

Figure 7:
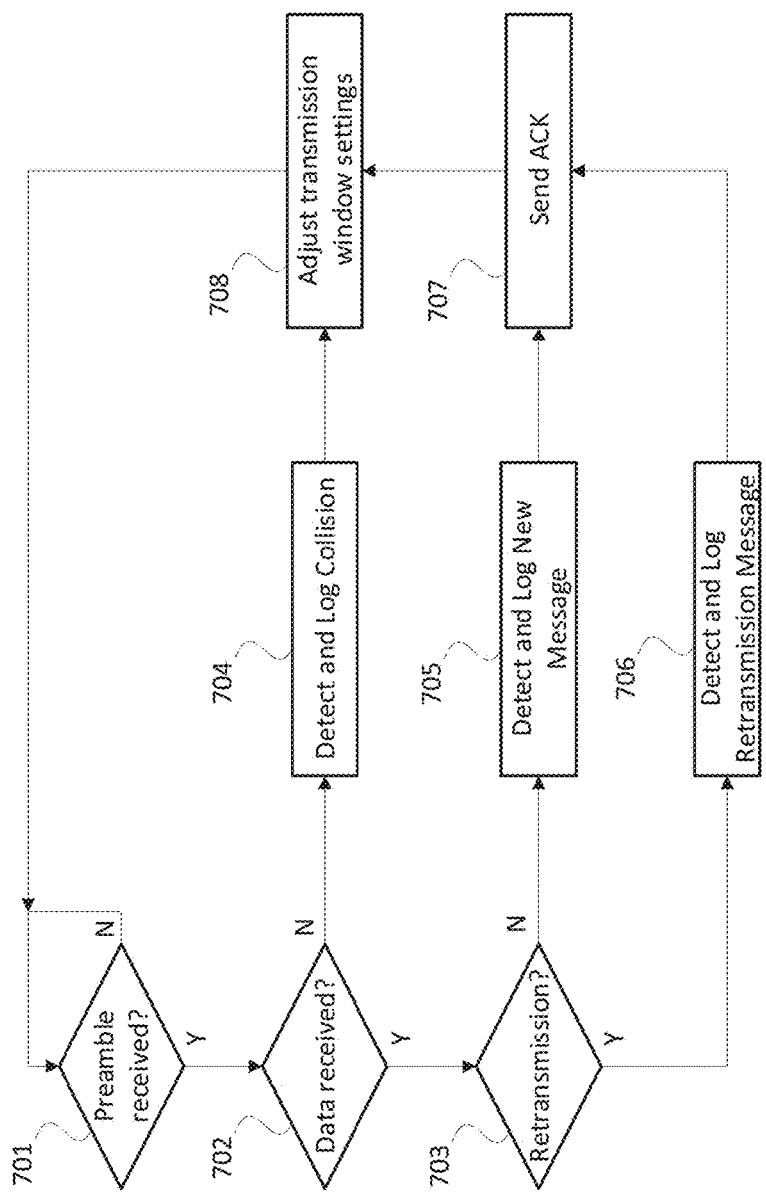
FIG. 7 is an example process flow implemented by a wireless gateway.

FIG. 7 shows a process for the wireless gateway 200 to adjust transmission window settings based on collisions, retransmissions, and/or information about the collisions and retransmissions. At step 701, the wireless gateway 200 waits for a preamble indicating the beginning of a message received from a wireless node 300. The preamble may indicate information about the message, such as information about the wireless node 300 that sent the message (e.g., an identity of the wireless node 300 or a group containing the wireless node 300, the type of wireless node 300, etc.) and/or information about the content of a message (e.g., the priority of the message). After receiving the preamble, the wireless gateway 200 waits to receive the rest of the message.

At step 702, the wireless gateway 200 determines whether the rest of the message was successfully received and/or decoded. If the rest of the message was not successfully received and/or decoded, the wireless gateway 200 may determine that a collision likely occurred and log the detected collision at step 704. The logged collision may include the detected preamble and/or information indicated by the detected preamble, such as a priority of the collided message or information about a wireless node 300 that sent the collided message.

If the message was received at step 702, then at step 703 the wireless gateway 200 may determine whether the message was received during a transmission window or a retransmission window based on a time of the reception of the message. If the message was not received during a retransmission window, at step 705 the wireless gateway 200 may determine that the message was not retransmitted and log an indication of a new message. The logged indication may include information from the preamble of the message, a header of the message, and/or the message itself, such as information indicating a priority of the message, a wireless node 300 that sent the message, a content of the message, a wireless noise level measured at the transmitting device, a transmission power corresponding to the message, and/or a level of the wireless noise threshold at the time of transmission. If the message was received during a retransmission window, at step 706 the wireless gateway 200 may determine that the message was a retransmission of a collided message and log an indication that a message was retransmitted. Again, the logged indication may include information from the preamble of the message, the header of the message, and/or the message itself, such as information indicating a priority of the message, a wireless node 300 that sent the message, a content of the message, a wireless noise level measured at the transmitting device, a transmission power corresponding to the message, a number of times the message was retransmitted, and/or a level of the wireless noise threshold at the time of transmission.

At step 707, the wireless gateway 200 may send an ACK message back to the wireless node 300 that transmitted the received message. The ACK message may contain transmission window settings, such as timing information for transmission and/or retransmission windows, an indication that the retransmission windows are enabled/disabled, and the like.

At step 708, the wireless gateway 200 may adjust the transmission window settings based on the collisions, retransmitted messages, and new messages (e.g., as logged in steps 704-706). For example, if the wireless gateway 200 detects a large number of collisions (e.g., a number of collisions above a threshold in a certain period of time), it may extend the length of the retransmission window in order to provide more opportunities for retransmissions. Based on the ratio of logged new messages to retransmitted messages, the wireless gateway 200 may increase or reduce the amount of time allotted to the retransmission windows (e.g., such that relatively more retransmission messages yield a longer retransmission window).

The wireless gateway 200 may further adjust the transmission window settings based on information associated with the collisions, retransmitted messages, and/or new messages. For example, based on detecting a number of collided or retransmitted messages associated with high priorities, the wireless gateway 200 may extend a retransmission window and/or adjust a minimum priority threshold for messages to be sent in a retransmission window. Additionally or alternatively, based on detecting a number of collided or retransmitted messages associated with relatively lower priorities, the wireless gateway 200 may extend the retransmission window by a lesser amount, or not at all (or even reduce the length of the retransmission window). Similarly, messages associated with certain wireless nodes 300 (e.g., individual wireless nodes 300, groups of wireless nodes 300, or types of wireless nodes 300) may affect the adjustment of the transmission windows to a greater or lesser amount.

The wireless gateway 200 may adjust transmission window settings based on detected patterns observed from logged messages (e.g., messages logged at steps 704-706). For example, based on historical patterns, the wireless gateway 200 may determine that a large number of high priority messages are expected at a certain time of day. Accordingly, the wireless gateway 200 may extend a retransmission window and/or set a minimum priority threshold so that only high priority messages may be retransmitted during the retransmission window. The wireless gateway 200 may detect such patterns based on network conditions (e.g., wireless nodes 300 joining or leaving a local network), the state of an application running on the wireless gateway 200 (e.g., a security system being placed into an "armed" mode), time of day, day of week, and other such conditions. Such patterns may be used to dynamically adjust transmission window settings based on the conditions.

Figure 8:
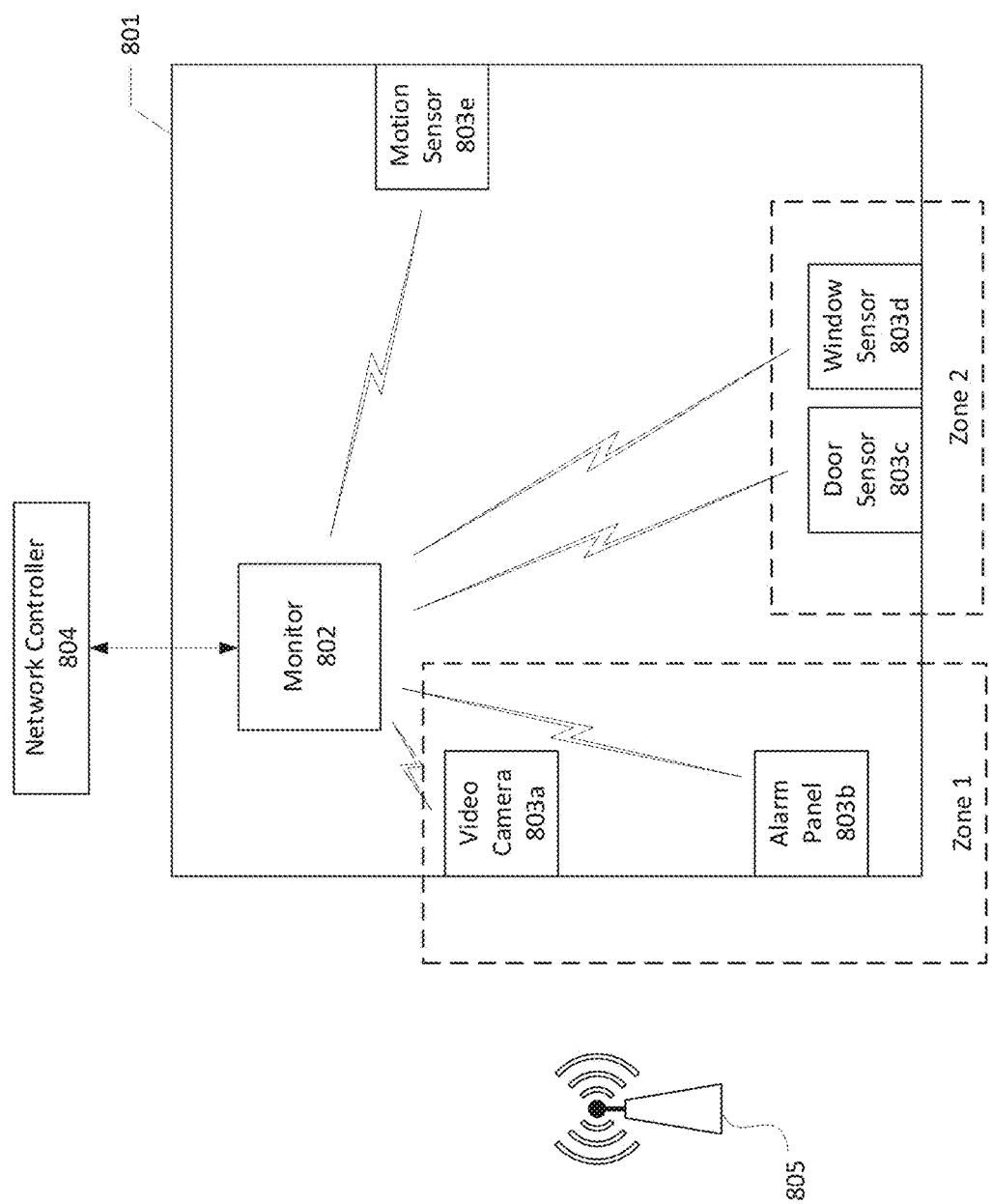
FIG. 8 is an example diagram showing a security system.

FIG. 8 shows an example security system that may detect and respond to wireless interference, whether inadvertent or intentional. The security system may be located within a premises 801, such as a residence or business. A monitor 802 may communicate with the security devices 803 via a wireless network, the security devices including a video camera 803a, an alarm panel 803b, a door sensor 803c, a window sensor 803d, and a motion sensor 803e. The monitor 802 may be and/or comprise a wireless gateway 200. For example, the monitor 802 may execute the process of FIG. 7 to adjust transmission window settings for the security devices 803. Similarly, the security devices 803 may be and/or comprise the wireless nodes 300. For example, the security devices 803 may transmit messages to the monitor 802 according to the process of FIG. 4. The network controller 804 may be and/or comprise a network computing device 109. Accordingly, the network controller 804 may perform the functions ascribed to the monitor 802 alone or in conjunction with the monitor 802.

An interfering device 805 may be a device used to intentionally disable a security system by increasing the wireless noise so that the security devices 803 will not transmit messages to the monitor 802 (e.g., because the wireless noise at the security devices 803 may remain above a wireless noise threshold and/or because the wireless noise may cause wireless collisions at the monitor 802). Additionally or alternatively, the interfering device 805 may be an inadvertent source of interference (e.g., a wireless router) that may nevertheless disable or impair the security system (e.g., by causing wireless collisions).

If the interfering device 805 begins interfering with the security devices 803, it may affect some devices more than others based on the distance between the interfering device 805 and the security devices 803, the location of the interfering device 805, the location of walls, and/or other signal propagation factors. In the example of FIG. 8, the interfering device 805 may affect the security devices 803a and 803b in zone 1 more than it affects the security devices 803c and 803d in zone 2 due to its closer proximity to zone 1. Additionally, as the interfering device 805 moves closer to the premises (e.g., due to an attempted intrusion), it may disable the security devices 803a and 803b (e.g., by causing a wireless noise level for the devices to increase such that the devices cannot transmit without causing a wireless collision) in zone 1 before it is able to disable the security devices 803c and 803d in zone 2.

Figure 9:
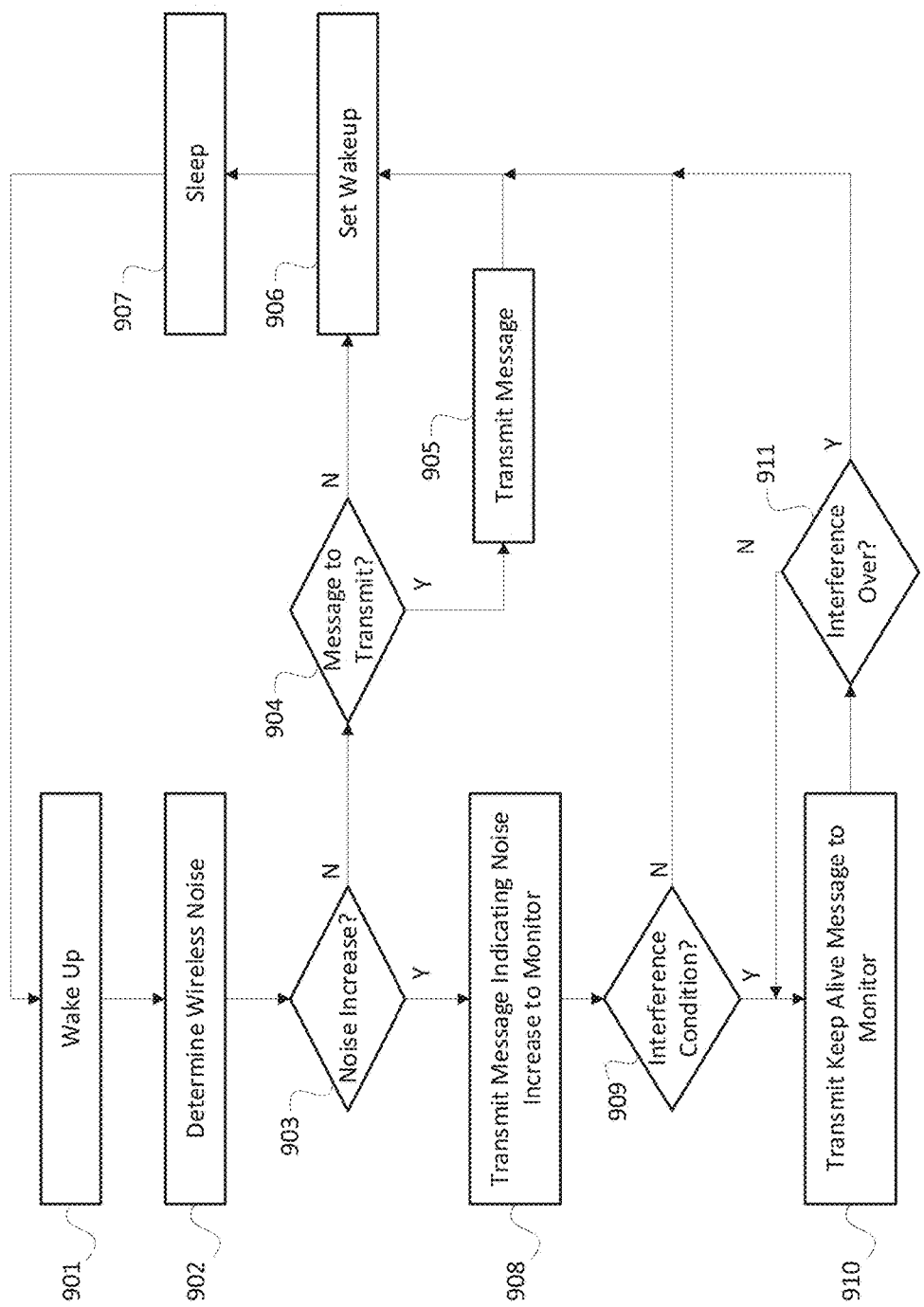
FIG. 9 is an example process flow implemented by a security device.

FIG. 9 shows an example process that may be executed by a security device 803 to detect and respond to interference caused by a jamming attack or some other source of wireless noise. At step 901, the security device 803 may wake up from a low power mode. The security device 803 may wake up periodically to measure wireless noise on the channel, to transmit messages containing, for example, security sensor readings or other security-related data, or for any other purpose.

At step 902, the security device 803 may determine one or more wireless noise measurements based on signals received via its antenna(s). The security device 803 may determine a wireless noise level for a particular channel or band of channels by measuring the strength of a signal received via a wireless interface 305. The wireless noise level may indicate signal strength in relative or absolute (e.g., dBm, mW) units. The security device 803 may sample and measure the signal strength received over a small time period via an antenna of the security device 803, the level indicating the wireless noise on the channel or band of channels.

At step 903, based on the one or more wireless noise measurements and/or one or more previously-recorded wireless noise measurements (e.g., from iterations through step 902 and/or previous times the security device was awake), the security device 803 may determine if the wireless noise level exceeds a wireless noise threshold. The security device 803 may determine if the wireless noise has increased over a certain threshold (e.g., −40 dBm). Additionally or alternatively, the security device 803 may determine if the wireless noise has increased relative to previous wireless noise measurements. The security device 803 may determine a wireless noise increase based on a determination that the wireless noise increased in each of a number of previous measurements (e.g., each of the last three measurements had a higher wireless noise than the previous measurement), in each of a certain portion or percentage of a number of previous measurements (e.g., in more than half of the previous four measurements), and/or the like.

Responsive to a negative decision at step 903, at step 904 the security device 803 may determine whether it has a message to transmit (e.g., in a transmission queue). For example, the security device 803 may have woken up at step 901 in order to transmit a message containing sensor data and/or other regularly scheduled messages. Accordingly, at step 905, the security device 803 may transmit any message in a transmission queue to the monitor 802. The security device 803 may use the process of FIG. 4 to transmit the message. The security device 803 may assign a priority to the message for transmission according to the process of FIG. 4 based on the type of message.

Responsive to determining a wireless noise increase in step 903, at step 908, the security device 803 may transmit a message indicating the wireless noise increase to the monitor 802. The message indicating the wireless noise increase may include one or more wireless noise measurements, timing information associated with the wireless noise increase (e.g., a time period over which the noise increased, timestamps indicating the times at which wireless noise measurements were taken, and/or the like), and/or other data associated with the wireless noise increase. The data associated with the wireless noise increase may be transmitted as part of another message. For example, if the security device 803 already has a queued message or packet to transmit, the data associated with the wireless noise increase may be transmitted in the same message and/or the same packet (e.g., in a header or body portion of the same packet). The security device 803 may transmit the message indicating the wireless noise increase according to the procedure of FIG. 4. The security device 803 may assign a high priority to the message indicating the wireless noise increase. For example, the message indicating the wireless noise increase may be assigned a maximum priority (or some other pre-defined priority). The security device 803 may also assign an increased priority based on the type of message containing the data associated with the wireless noise increase. For example, if such data is included with a regularly scheduled message that would normally be assigned a low priority, the wireless node 300 may increase the priority for the message to a medium priority.

At step 909, the security device 803 may determine whether to set an interference condition. The security device 803 may determine the interference condition based on information received from the monitor 802. For example, the monitor 802 may transmit an indication that the security device 803 (and/or other security devices 803) is currently in an interference condition. Accordingly, reception of an interference indication from the monitor 802 may cause the security device 803 to detect an interference condition. Such an indication may be included in an ACK message received from the monitor 802.

The security device 803 may be unable to receive any such indication from the monitor 802 due to interference from the interfering device 805. Accordingly, the security device 803 may wait to receive a message (e.g., an ACK message) from the monitor 802 after transmitting the message indicating the wireless noise increase. If no such ACK message is successfully received, the security device 803 may detect an interference condition. Accordingly, the security device 803 may listen for an ACK message from the monitor 802 for a certain period of time, during a number of pre-defined time windows (e.g., downlink windows), and/or the like before setting an interference condition.

At step 910, the security device 803 may transmit one or more "keep alive" messages to the monitor 802 upon detecting an interference condition. The keep alive messages may be transmitted periodically to the monitor 802 so that the monitor 802 may determine if the security device 803 is still able to transmit a message to the monitor 802. Accordingly, if the monitor 802 stops receiving keep alive messages from a security device 803, it may determine that the security device 803 is unable to transmit a message (e.g., due to interference from the interfering device 805). The keep alive messages may include noise measurements (e.g., the most recent one or more noise measurements). The security device 803 may transmit the keep alive messages according to the process of FIG. 4. The security device 803 may transmit the keep alive messages in special time windows, such as retransmission time windows, according to the process of FIG. 4. The security device 803 may transmit keep alive messages at a maximum power without regard to wireless noise thresholds and/or transmission time windows.

At step 911, the security device 803 may detect whether the interference condition is over. The security device 803 may wait until it receives an indication that the interference condition is over from the monitor 802. Additionally or alternatively, the security device 803 may determine that the interference condition is over based one or more updated noise measurements. For example, the security device 803 may detect that the interference condition is over based on determining that the most recent one or more noise measurements is/are lower than a noise threshold. Accordingly, the security device 803 may determine an additional one or more noise measurements at step 911 (e.g., to send to the monitor 802 at step 910 and/or to detect whether the interference condition is over).

At step 906, the security device 803 may set a wakeup time before entering a low power sleep mode. The wakeup time may be determined based on the previous context of the security device 803. For example, after sending a regularly scheduled transmission at step 905, the security device 803 may set a wakeup timer based on a schedule indicating timing information for regularly scheduled transmissions, timing information for reading security sensors, timing information for measuring wireless noise, and the like. The security device 803 may use a maximum wakeup time such that the security device 803 will wake up at some minimum frequency. Accordingly, if the difference between the time of a next item on the schedule and the current time is more than a maximum wakeup time, the security device 803 may set the maximum wakeup time. If an interference condition has just ended (e.g., as detected at step 911) and/or a noise increase was detected but an interference condition was not detected (e.g., as determined at step 909), the security device 803 may use a shortened maximum wakeup time at step 906. At step 907, the security device 803 sleeps until the wakeup time expires (e.g., as indicated by wakeup timer 309).

Figure 10:
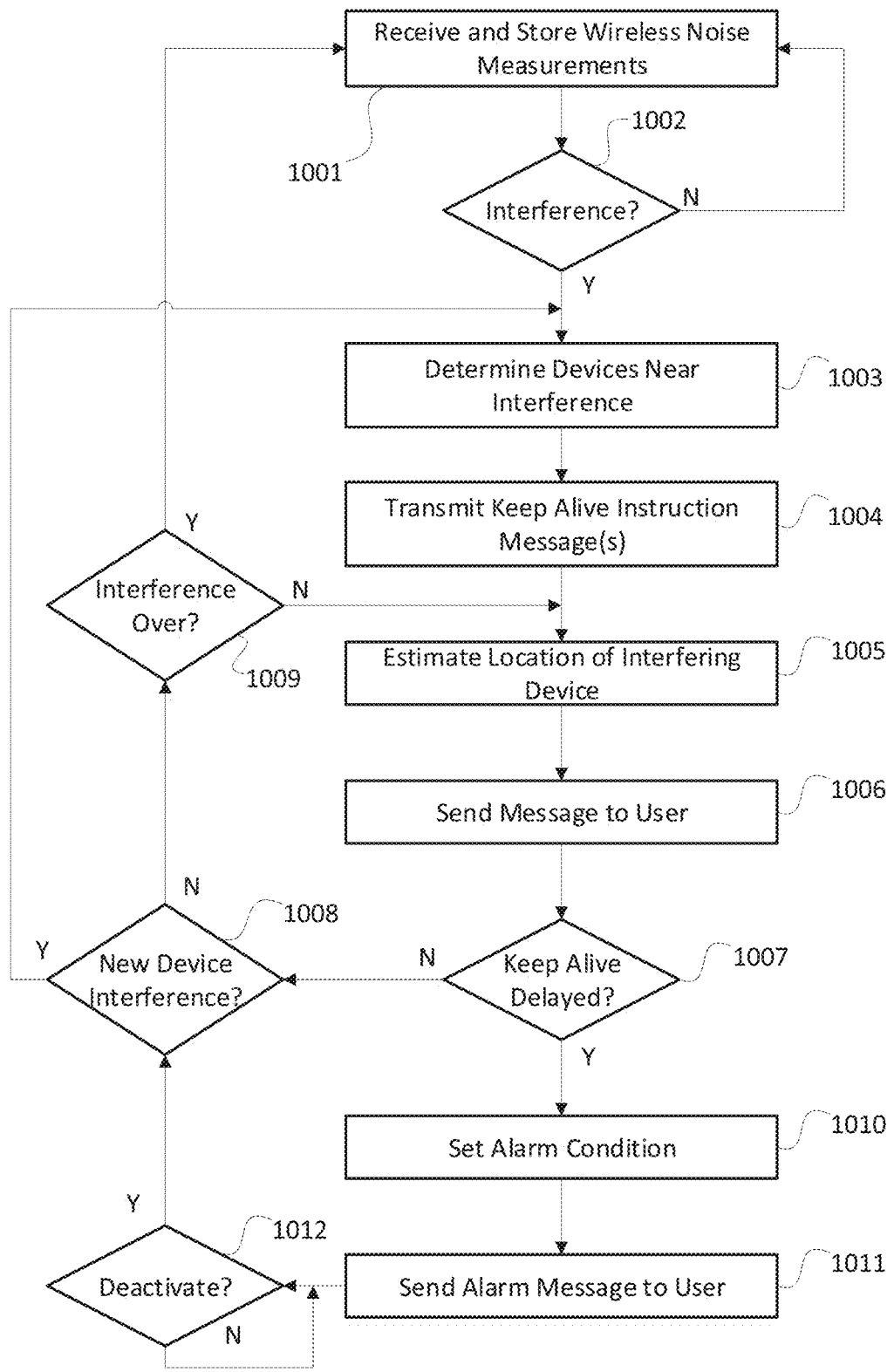
FIG. 10 is an example process flow implemented by a security monitor.

FIG. 10 shows an example process for detecting and responding to an interference condition (e.g., due to an increased noise level) that may be executed by a monitor 802 of a security system. At step 1001, the monitor 802 may receive and store wireless noise measurements from one or more security devices 803 (e.g., the security devices 803a-

803e). Such wireless noise measurements may be included, for example, in messages indicating a wireless noise increase as discussed for step 908 and/or as part of regular transmissions, in response to requests from the monitor 802, and the like. The wireless noise measurements may be accompanied by timing information such as timestamps indicating the time of measurement for each respective wireless noise measurement. The monitor 802 may store the wireless noise measurements, any timing information, and information indicating the security device 803 that sent the wireless noise measurement.

Based on the one or more wireless noise measurements received from the security devices 803, at step 1002, the monitor 802 may determine whether at least one of the security devices 803 is receiving increased noise and set an interference condition. For example, based on one or more wireless noise measurements corresponding to a particular security device 803 remaining over a certain threshold for a certain period of time and/or steadily increasing over a certain period of time, the monitor 802 may set an interference condition corresponding to the particular security device 803. The monitor 802 may only set an interference condition if more than one security device 803 is receiving increased noise. For example, if only one security device 803 is receiving increased noise, the monitor 802 may determine that the security device 803 is experiencing a measurement error. Accordingly, the monitor 802 may set an interference condition for a security device 803 based on the one or more wireless measurements received from the security device 803 and/or based on timing information associated with the one or more measurements received from the security device 803.

The monitor 802 may detect an interference condition if it fails to receive transmissions from a security device 803 for more than a threshold amount of time. For example, if a security device 803 usually transmits messages to the monitor 802 every 5 minutes, and 15 minutes have elapsed without receiving any transmission from the security device 803, the monitor 802 may detect an interference condition for that security device 803. The threshold amount of time for detecting an interference condition may vary for different security devices 803 and/or for different types of security devices 803 based on regular transmission times (e.g., door sensors may send transmissions more often than window sensors, external sensors may send transmissions more often than internal sensors, and the like). Accordingly, the monitor 802 may determine an interference condition based on the device or type of device from which it failed to receive a message and/or a frequency of messages associated with the security device 803 or type of security device 803.

At step 1003, the monitor 802 may determine one or more security devices 803 near the source of interference and set an interference condition for those security devices 803. For example, the monitor 802 may first set an interference condition for the security device 803a based on wireless noise measurements received from the security device 803a. Then, the monitor 802 may determine an interference condition for other nearby security devices (e.g., the security device 803b in the same zone). Additionally or alternatively, at step 1003, the monitor 802 may determine other security device(s) 803 within a range of the interfered security device 803 (e.g., based on distances between coordinates associated with the security devices 803, based on other security devices 803 matching the same zone as the interfered security device 803, etc.), and set interference conditions for all or some of the security devices 803 within the range.

At step 1004, the monitor 802 may send one or more keep alive instruction messages to the interfered security device(s) 803 and/or nearby security devices 803, each message containing an instruction that causes the respective security device 803 to periodically send keep alive messages to the monitor 802. The keep alive instruction message may include one or more transmission window settings (e.g., in the header of a packet containing the keep alive instruction) configuring the security devices 803 to transmit the keep alive instructions in special time windows (e.g., a retransmission window or other dedicated window).

At step 1005, the monitor 802 may attempt to estimate the location of the interfering device 805 based on the one or more wireless noise measurements received at step 1001 and/or at other times. Turning to FIG. 8, the monitor 802 may estimate the location of the interfering device 805 based on wireless noise measurements received by multiple security devices 803a-803e. For example, if two security devices 803a and 803b transmitted wireless noise measurements indicating a high level of wireless noise (e.g., above a wireless noise threshold), and two other security devices 803c and 803d transmitted wireless noise measurements indicating a relatively smaller level of wireless noise, monitor 802 may determine that the interfering device 805 is closer to zone 1 (containing the first two security devices 803a and 803b) than to zone 2 (containing the other two security devices 803c and 803d). Accordingly, the monitor 802 may store location information for each security device 803a-803e that it can use to estimate the location of the interfering device 805. The location information may comprise zone information (e.g., particular pre-defined areas), and the location estimation may comprise a nearest device and/or zone. Additionally or alternatively, the stored location information may comprise coordinates (e.g., GPS coordinates) for some or all of the security devices 803. The monitor 802 may estimate a distance and/or direction from one or more security devices 803 based on the relative strength of the wireless noise at different security devices 803 and/or changes in the wireless noise over time at the different security devices 803 (e.g., using triangulation techniques). Accordingly, the estimated location information may comprise an estimated direction and/or estimated coordinates of the interfering device 805 (e.g., based on triangulating using the estimated distances from the coordinates of multiple security devices 803). The monitor 802 may determine whether the estimated location of the interfering device 805 is within the premises. For example, the monitor 802 may compare the estimated location to a map indicating the boundaries of the premises. Additionally, when an estimated location of the interfering device 805 was previously within a premises (e.g., within a previous iteration through step 1004), the monitor 802 may determine that an updated estimated location is no longer within a premises.

At step 1006, the monitor 802 may send a message indicating that one or more devices is in an interference condition to one or more users and/or personnel associated with the security system (e.g., a resident of a home, security personnel, emergency services, etc.) The message may indicate the interfered security devices 803, how long the devices have been in an interference condition (e.g., based on timing information associated with the noise measurements), the estimated location of the interfering device, whether the interfering device is within the premises or not, and/or other such information. Additionally or alternatively, the monitor 802 may determine a threat level based on a type of the interfered security device 803. For example, an interfered door sensor may indicate a high threat level (e.g., because an intrusion through the door may be undetectable if the door sensor is disabled), whereas an interfered motion detector may indicate a lower threat level. The message may further indicate the determined threat level. Additionally or alternatively, the message may indicate that a recipient of the message can trigger an alarm at the premises. For example, the alarm message may be a text message that indicates "reply ALARM to trigger the alarm at the premises." A recipient of the message may optionally reply as indicated to trigger the alarm. Other methods could be used to receive a reply from a user.

The message may include a potential source of the wireless noise (e.g., a potential identity of the interfering device 805). The message may list typical sources of interference based on one or more frequency bands on which the wireless network operates. For example, if microwaves and WI-FI access points are typical sources of noise in the one or more frequency bands, the message may suggest that a user try disabling or restarting those devices. Additionally, based on the estimated location of the interfering device being inside the premises, the message may indicate that the user should try to locate the interfering device inside the premises.

At step 1007, the monitor 802 may detect whether the keep alive messages (e.g., from the interfered security device 803 and/or other security devices 803 that received an instruction to transmit keep alive messages) are delayed. The monitor 802 may detect that the keep alive messages are not delayed if all or some of the most recent keep alive messages transmitted from a particular security device 803 have been received. For example, if more than a threshold number or percentage (e.g., 50%) of the last number N (e.g., ten) keep alive messages have been received, the monitor 802 may determine that the particular security device 803 can still carry out a security function, and proceed to step 1008. The monitor 802 may measure a delay associated with an expected keep alive message. For example, if a time elapses without receiving an expected keep alive message, the process may proceed to step 1010.

Responsive to the received keep alive messages, the monitor 802 may further adjust transmission window settings following the procedure of FIG. 7. For example, based on a number of missed keep alive messages, new keep alive messages and/or other messages, retransmitted keep alive messages and/or other messages, collisions between keep alive messages and/or other messages, and the like, the monitor 802 may adjust transmission window settings as described at step 708. The monitor 802 may perform the process of FIG. 7 in parallel with the process of FIG. 10.

At step 1008, the monitor 802 may determine whether any other security devices 803 are in an interference condition. The monitor 802 may send requests for noise measurements from other security devices 803 if it has not already received recent noise measurements for those security devices 803. For example, the monitor 802 may send requests for noise information to other security devices 803 in the same zone as the interfered security devices 803, to security devices 803 in nearby zones, to other security devices 803 with nearby coordinates, to all other security devices 803, and/or the like. Based on the received wireless noise measurements and/or stored wireless noise measurements (e.g., from step 1001), the monitor 802 may determine whether any other security devices 803 are in an interference condition. Additionally or alternatively, if the security devices 803 fail to respond to a request for a wireless noise measurement, the monitor 802 may determine that the unresponsive security devices 803 are in an interference condition. Based on detecting additional interfered security devices 803, the monitor 802 may determine additional security devices 803 near the interfered security devices 803, send additional keep alive instruction messages, again estimate the location of the interfering device 805, and/or send an updated message to the one or more users (e.g., according to steps 1003-1006).

At step 1009, the monitor 802 may determine whether the interference condition is over. The monitor 802 may determine that the interference condition is over based on updated wireless noise measurements received from the interfered security device(s) 803 (e.g., in the one or more keep alive messages from the interfered security device(s) 803). The monitor 802 may determine that the interference condition is over if the updated wireless noise measurements indicate that the wireless noise has fallen beneath a threshold for some or all of the interfered security device(s) 803. The monitor 802 may determine that other security device(s) 803 nearby an interfered security device 803 (e.g., within the same zone and/or within a threshold distance according to coordinates associated with the devices) transmitted normal wireless noise measurements (e.g., measurements indicating noise lower than a threshold noise level), and accordingly determine that the interference condition was a measurement error. In such a situation, the monitor 802 may send a notification to one or more users indicating that the interfered security device 803 may need to be repaired and/or inspected. Responsive to determining that the interference condition is not over, the monitor 802 may continue to estimate an updated location and/or send updated messages to the one or more users (e.g., at steps 1005-1006).

At step 1010, if the monitor 802 fails to receive keep alive messages from one or more interfered security devices 803, it may set an alarm condition. The alarm condition may cause the security system to respond according to an alarm protocol. For example, the security system may sound an audio alarm, activate security cameras, turn on lights, and/or the like. The monitor 802 may set an alarm based on a type of the device from which a keep alive message was delayed and/or a threat level (e.g., as determined at step 1006). For example, if a keep alive message is not received from an external sensor such as a door sensor 803c or a window sensor 803d, the alarm condition may be set. However, if a keep alive message is not received from another type of device (e.g., an internal motion sensor 803e), the alarm condition may be left unset, and the monitor 802 may perform some other action (e.g., sending an alarm message according to step 1011 without triggering the alarm condition).

At step 1011, an alarm message may be sent to one or more users (e.g., an operator, who may connect to the home security system, call a resident and/or building manager, and/or alert emergency services). The message may indicate how a recipient of the message can deactivate the alarm at the premises. For example, the alarm message may be a text message that indicates "reply DEACTIVATE to deactivate the alarm at the premises."

At step 1012, the monitor 802 may continue performing one or more actions according to the alarm protocol until a deactivation instruction is received. A recipient of the message of step 1011 may optionally reply as indicated by the message to deactivate the alarm. Other methods could be used to receive a reply from a user, operator, and/or administrator of the security system.

The monitor 802 may cause a deactivation of the alarm based on receiving one or more of the delayed keep alive messages. For example, if the alarm was triggered at step 1010 because one or more keep alive messages from the security device 803a were delayed, then receipt of at least some of the one or more keep alive messages from the security device 803a may cause the monitor 802 to deactivate the alarm. The monitor 802 may deactivate the alarm after receiving the delayed keep alive messages if the less than a threshold amount of time has elapsed since the alarm was activated. Additionally or alternatively, the monitor 802 may deactivate the alarm if a wireless noise measurement in at least one of the delayed keep alive messages is less than a threshold.

One or more processes described herein may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid-state memory, RAM, etc. The functionality of the program modules may be combined or distributed as desired. In addition, the functionality may be embodied in whole or in part in firmware or hardware equivalents such as integrated circuits, field programmable gate arrays (FPGA), application-specific integrated circuits (ASIC), and the like. Particular data structures may be used to more effectively implement one or more examples of the disclosure, and such data structures are contemplated within the scope of computer executable instructions and computer-usable data described herein.

Aspects of the disclosure have been described in terms of various examples. While examples of systems and methods are shown, it will be understood by those skilled in the art, that the disclosure is not limited to these examples. Modifications may be made by those skilled in the art, particularly in light of the foregoing teachings. For example, each of the features of the aforementioned examples may be utilized alone or in combination or sub-combination. For example, any of the above described systems and methods or parts thereof may be combined with the other methods and systems or parts thereof described above. For example, the steps shown in the figures may be performed in other than the recited order, and one or more steps shown may be optional. It will also be appreciated and understood that modifications may be made without departing from the true spirit and scope of the present disclosure. The description is thus to be regarded as providing examples of, instead of a restriction on, the present disclosure.

What is claimed is:

1. A method comprising:
   receiving, by a monitoring system and from a first sensor located at a premises, data indicative of an increase in a wireless noise level for the first sensor;
   determining, by the monitoring system, that the first sensor is located within a particular range of a second sensor located at the premises;
   determining, by the monitoring system, that a message associated with the second sensor is delayed;
   triggering, by the monitoring system, an alarm at the premises; and
   sending, by the monitoring system and to a user device, a notification that is indicative of the alarm.

2. The method of claim 1, wherein the determining that the message associated with the second sensor is delayed comprises determining that a time period elapsed before receiving the message associated with the second sensor.

3. The method of claim 1, further comprising estimating, based on the data indicative of the increase in the wireless noise level, a location of a source of wireless noise.

4. The method of claim 1, further comprising:
   determining one or more sensors within a range of an estimated location of a source of wireless noise; and
   causing each sensor of the one or more sensors within the range of the estimated location to send, to the monitoring system, a message indicating a wireless noise level for the respective sensor.

5. The method of claim 1, further comprising:
   determining, based on an estimated location of a source of wireless noise, that the source of wireless noise is within the premises; and
   sending a notification comprising the estimated location and indicative of the source of wireless noise within the premises.

6. The method of claim 1, further comprising:
   receiving, from the second sensor, the delayed message, wherein the delayed message is indicative of a wireless noise level for the second sensor; and
   based on the indicated wireless noise level for the second sensor, deactivating the alarm at the premises.

7. The method of claim 1, further comprising:
   causing the first sensor to periodically send, to the monitoring system, a message indicating a wireless noise level for the first sensor.

8. A method comprising:
   receiving, by a monitoring system and from a first sensor located at a premises, first data indicative of a wireless noise level for the first sensor;
   receiving, by the monitoring system and from a second sensor located at the premises, second data indicative of a wireless noise level for the second sensor;
   after receiving the first data and the second data, determining, by the monitoring system and based on a location of the first sensor and a location of the second sensor, that an interfering device has entered the premises;
   determining, by the monitoring system and based on the location of the first sensor and the location of the second sensor, location information for the interfering device; and
   sending, by the monitoring system and to a user device, a notification indicative of a threat and the location information for the interfering device.

9. The method of claim 8, wherein the first data is indicative of an increase, relative to at least one of a noise threshold associated with the first sensor or previous noise measurements by the first sensor, in the wireless noise level for the first sensor,
   wherein the second data is indicative of an increase, relative to at least one of a noise threshold associated with the second sensor or previous noise measurements by the second sensor, in the wireless noise level for the second sensor.

10. The method of claim 8, further comprising:
    causing each of the first sensor and the second sensor to send, to the monitoring system, a message indicating a wireless noise level for the respective sensor.

11. The method of claim 8, further comprising:
    determining, by the monitoring system, a delay in reception of a message from one of the first sensor and the second sensor; and triggering, based on the determined delay, an alarm at the premises.

12. The method of claim 11, wherein determining the delay in reception of the message comprises receiving the message during a time window reserved for resent messages.

13. The method of claim 8, further comprising:
receiving, by the monitoring system and during a time window reserved for resent messages, a message; and
adjusting, based on the message, the time window.

14. The method of claim 8, further comprising:
determining, by the monitoring system, a type of sensor associated with a delay in reception of an expected message; and
triggering, based on the determined type of sensor, an alarm at the premises.

15. A method comprising:
determining, by a device, a first wireless noise level;
determining, based on the first wireless noise level and on a wireless noise threshold, an increased wireless noise threshold;
determining that a second wireless noise level does not exceed the increased wireless noise threshold; and
sending, by the device and to a monitoring system, a first data packet, wherein the first data packet comprises data indicating one or more of the first wireless noise level and the second wireless noise level.

16. The method of claim 15, further comprising:
determining, based on the first data packet, that an interfering device has entered a premises;
determining, based on a location of the device, location information for the interfering device; and
sending, to a user device, a notification indicative of a threat and the location information for the interfering device.

17. The method of claim 15, further comprising determining, based on a priority value for the first data packet, a transmission power, wherein the sending the first data packet comprises sending, using the determined transmission power, the first data packet.

18. The method of claim 17, wherein determining the transmission power further comprises determining, based on the priority value for the first data packet and on the increased wireless noise threshold, the transmission power.

19. The method of claim 15, further comprising:
receiving, by the device and from the monitoring system, a second data packet indicative of successful transmission of the first data packet, wherein the second data packet comprises an instruction configured to cause the device to adjust one or more retransmission time periods.

20. The method of claim 15, wherein the sending the first data packet further comprises:
based on a time period elapsing before receiving, by the device and from the monitoring system, a second data packet, increasing, by the device, a priority of the first data packet.

21. An apparatus comprising:
one or more processors; and
memory storing instructions that, when executed by the one or more processors, cause the apparatus to:
receive, from a first sensor located at a premises, data indicative of an increase in a wireless noise level for the first sensor;
determine that the first sensor is located within a particular range of a second sensor located at the premises;
determine that a message associated with the second sensor is delayed;
trigger an alarm at the premises; and
send, to a user device, a notification that is indicative of the alarm.

22. The apparatus of claim 21, wherein the instructions, when executed by the one or more processors, cause the apparatus to determine that the message associated with the second sensor is delayed by determining that a time period elapsed before receiving the message associated with the second sensor.

23. The apparatus of claim 21, wherein the instructions, when executed by the one or more processors, cause the apparatus to estimate, based on the data indicative of the increase in the wireless noise level, a location of a source of wireless noise.

24. An apparatus comprising:
one or more processors; and
memory storing instructions that, when executed by the one or more processors, cause the apparatus to:
receive, from a first sensor located at a premises, first data indicative of a wireless noise level for the first sensor;
receive, from a second sensor located at the premises, second data indicative of a wireless noise level for the second sensor;
after receiving the first data and the second data, determine, based on a location of the first sensor and a location of the second sensor, that an interfering device has entered the premises;
determine, based on the location of the first sensor and the location of the second sensor, location information for the interfering device; and
send, to a user device, a notification indicative of a threat and the location information for the interfering device.

25. The apparatus of claim 24, wherein the instructions, when executed by the one or more processors, cause the apparatus to:
determine a delay in reception of a message from one of the first sensor and the second sensor; and
trigger, based on the determined delay, an alarm at the premises.

26. The apparatus of claim 24, wherein:
the first data is indicative of an increase, relative to at least one of a noise threshold associated with the first sensor or previous noise measurements by the first sensor, in the wireless noise level for the first sensor,
the second data is indicative of an increase, relative to at least one of a noise threshold associated with the second sensor or previous noise measurements by the second sensor, in the wireless noise level for the second sensor.

27. An apparatus comprising:
one or more processors; and
memory storing instructions that, when executed by the one or more processors, cause the apparatus to:
determine a first wireless noise level;
determine, based on the first wireless noise level and on a wireless noise threshold, an increased wireless noise threshold;
determine that a second wireless noise level does not exceed the increased wireless noise threshold; and
send, to a monitoring system, a first data packet, wherein the first data packet comprises data indicating one or more of the first wireless noise level and the second wireless noise level.

28. The apparatus of claim 27, wherein the instructions, when executed by the one or more processors:
   cause the apparatus to determine, based on a priority value for the first data packet, a transmission power; and
   cause the sending, of the first data packet, to use the determined transmission power.

29. The apparatus of claim 27, wherein the instructions, when executed by the one or more processors, cause the apparatus to receive, from the monitoring system, a second data packet indicative of successful transmission of the first data packet,
   wherein the second data packet comprises an instruction configured to cause the apparatus to adjust one or more retransmission time periods.

* * * * *